(12) United States Patent
Li et al.

(10) Patent No.: US 10,367,710 B2
(45) Date of Patent: Jul. 30, 2019

(54) METHOD AND APPARATUS FOR GENERATING NETWORK DEPENDENCIES

(71) Applicant: SOLARWINDS WORLDWIDE, LLC, Austin, TX (US)

(72) Inventors: Na Li, Austin, TX (US); Pavlo Ostashenkov, Lviv (UA); Karlo Martin Zatylny, Dripping Springs, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 231 days.

(21) Appl. No.: 14/920,557

(22) Filed: Oct. 22, 2015

(65) Prior Publication Data
US 2017/0118104 A1    Apr. 27, 2017

(51) Int. Cl.
*H04L 12/26* (2006.01)
*H04L 12/24* (2006.01)

(52) U.S. Cl.
CPC ............ *H04L 43/10* (2013.01); *H04L 41/065* (2013.01); *H04L 41/0618* (2013.01);
(Continued)

(58) Field of Classification Search
None
See application file for complete search history.

(56) References Cited

U.S. PATENT DOCUMENTS

| | | | | |
|---|---|---|---|---|
| 7,197,561 B1 * | 3/2007 | Lovy | ................... | H04L 41/0233 709/217 |
| 7,263,634 B2 * | 8/2007 | Wu | ..................... | G06F 11/2257 714/46 |

(Continued)

FOREIGN PATENT DOCUMENTS

| | | |
|---|---|---|
| JP | 2004-193966 A | 7/2004 |
| WO | 01/86380 A2 | 11/2001 |
| WO | 01/86380 A3 | 11/2001 |

OTHER PUBLICATIONS

Solarwinds: "Orion NPM Version 11.5 Release Notes", XP055345403, Apr. 15, 2015 pp. 1-12.

(Continued)

*Primary Examiner* — Viet D Vu
*Assistant Examiner* — James A Edwards
(74) *Attorney, Agent, or Firm* — Squire Patton Boggs (US) LLP

(57) ABSTRACT

A method and apparatus may include determining a root. The root includes a first node within a cluster of nodes of a network. The method may also include generating at least one network dependency between the root and a second node. The at least one generated network dependency corresponds to a connection between nodes of the network. The at least one generated network dependency corresponds to a directional path from the apparatus to the second node. The method may include polling the second node. The polling occurs via the at least one network dependency that has been generated between the apparatus and the second node. The method may also include determining that the second node is unreachable. The method may also include generating activated alerts relating to the unreachable second node, if any of the parent nodes of the second node are determined to be reachable by the apparatus.

9 Claims, 18 Drawing Sheets

(52) U.S. Cl.
CPC .......... *H04L 41/0631* (2013.01); *H04L 41/12* (2013.01); *H04L 43/0811* (2013.01); *H04L 43/12* (2013.01); *H04L 43/00* (2013.01)

(56) References Cited

U.S. PATENT DOCUMENTS

| | | | |
|---|---|---|---|
| 7,664,125 B1* | 2/2010 | Bauer | H04L 41/0233 370/408 |
| 2002/0111755 A1 | 8/2002 | Valadarsky et al. | |
| 2014/0122161 A1* | 5/2014 | Gupta | G06Q 10/0633 705/7.26 |

OTHER PUBLICATIONS

Anonymous: "Automatic Dependency Calculation" XP055345401, Apr. 1, 2015, pp. 1-7.
Solarwinds: "Create Dependencies Between Network Objects Automatically", XP055345395, Sep. 28, 2016, pp. 1-3.
Solarwinds: "Orion Network Performance Monitor, NPM, Administrator Guide—Version 11.5.2.2", XP055345392, Nov. 16, 2015, pp. 1-60.
European Search Report application No. 16195009.2 dated Feb. 22, 2017.
Japanese Notice of Allowance issued in corresponding Japanese Patent Application No. 2016-207013 dated Jul. 31, 2018.
Japanese Notice of Reasons for Refusal dated Apr. 17, 2018, issued in corresponding JP Application No. 2016-207013.
European Office Action application No. 16195009.2 dated Jun. 21, 2018.

* cited by examiner

Node Dependencies Tree

- ● AutoDep-1-580-570-1
  - ● Parent - stp-1841.lab-stp
  - ● Child - lab-transit-sw3
- ● AutoDep-1-556-570-2
  - ● Parent - lab-transit-sw1
  - ● Child - lab-transit-sw3
- ● AutoDep-1-570-412-2
  - ● Parent - lab-transit-sw3
  - ● Child - tex-hyv-01.lab.tex
- ● AutoDep-1-570-568-3
  - ● Parent - lab-transit-sw3
  - ● Child - lab-transit-sw6
- ● AutoDep-1-570-572-3
  - ● Parent - lab-transit-sw3
  - ● Child - lab-transit-sw5

Fig. 10

METHOD AND APPARATUS FOR GENERATING NETWORK DEPENDENCIES

BACKGROUND

Field

Embodiments of the present invention relate to generating network dependencies for a given network topology.

Description of the Related Art

A network topology generally describes an arrangement of network elements within a network. The network topology of the network may depict the placement of the network elements, including device location and/or installation of the connections between the network elements. A network topology may also illustrate how data is transmitted between the different network elements within the network.

SUMMARY

According to a first embodiment, a method may include determining, by a polling engine, a root. The root may include a first node within a cluster of nodes of a network. The method may also include generating at least one network dependency between the root and a second node. The at least one generated network dependency corresponds to a connection between nodes of the network. The at least one generated network dependency corresponds to a directional path from the polling engine to the second node. The method may also include polling the second node. The polling occurs via the at least one network dependency that has been generated between the polling engine and the second node. The method may also include determining that the second node is unreachable. The method may also include generating activated alerts relating to the unreachable second node, if any of the parent nodes of the second node are determined to be reachable by the polling engine.

In the method of the first embodiment, the determining the root may include determining the root based on at least one of a user definition and a local information of the polling engine.

In the method of the first embodiment, at least one manually-added dependency has been added between the polling engine and the second node.

In the method of the first embodiment, the at least one manually-added dependency has precedence over at least one automatically-generated dependency.

In the method of the first embodiment, the at least one automatically-generated dependency does not conflict with the at least one manually-added dependency.

According to a second embodiment, an apparatus may include at least one processor. The apparatus may also include at least one memory including computer program code. The at least one memory and the computer program code may be configured, with the at least one processor, to cause the apparatus at least to determine a root. The root may include a first node within a cluster of nodes of a network. The apparatus may also be caused to generate at least one network dependency between the root and a second node. The at least one generated network dependency corresponds to a connection between nodes of the network. The at least one generated network dependency corresponds to a directional path from the apparatus to the second node. The apparatus may also be caused to poll the second node. The polling occurs via the at least one network dependency that has been generated between the apparatus and the second node. The apparatus may also be caused to determine that the second node is unreachable. The apparatus may also be caused to generate activated alerts relating to the unreachable second node, if any of the parent nodes of the second node are determined to be reachable by the apparatus.

In the apparatus of the second embodiment, the determining the root may include determining the root based on at least one of a user definition and a local information of the apparatus.

In the apparatus of the second embodiment, at least one manually-added dependency has been added between the apparatus and the second node.

In the apparatus of the second embodiment, the at least one manually-added dependency has precedence over at least one automatically-generated dependency.

In the apparatus of the second embodiment, the at least one automatically-generated dependency does not conflict with the at least one manually-added dependency.

According to a third embodiment, a computer program product may be embodied on a non-transitory computer readable medium. The computer program product may be configured to control a processor to perform a method including determining, by a polling engine, a root. The root may include a first node within a cluster of nodes of a network. The method may also include generating at least one network dependency between the root and a second node. The at least one generated network dependency corresponds to a connection between nodes of the network, and the at least one generated network dependency corresponds to a directional path from the polling engine to the second node. The method may also include polling the second node. The polling occurs via the at least one network dependency that has been generated between the polling engine and the second node. The method may also include determining that the second node is unreachable. The method may also include generating activated alerts relating to the unreachable second node, if any of the parent nodes of the second node are determined to be reachable by the polling engine.

In the computer program product of the third embodiment, the determining the root may include determining the root based on at least one of a user definition and a local information of the polling engine.

In the computer program product of the third embodiment, at least one manually-added dependency has been added between the polling engine and the second node.

In the computer program product of the third embodiment, the at least one manually-added dependency has precedence over at least one automatically-generated dependency.

In the computer program product of the third embodiment, the at least one automatically-generated dependency does not conflict with the at least one manually-added dependency.

BRIEF DESCRIPTION OF THE DRAWINGS

For proper understanding of the invention, reference should be made to the accompanying drawings, wherein:

FIG. 10 illustrates an example dependency tree, in accordance with certain embodiments of the present invention.

DETAILED DESCRIPTION

Certain embodiments of the present invention may be directed to a method and apparatus for generating dependencies among nodes of a given network topology. Generating a dependency generally refers to determining and/or ascertaining a relationship between at least two nodes of a network, where one node is dependent upon at least one other node. In other words, a generated dependency may be a node-to-node connection within the network topology. A network topology generally refers to a representation of how nodes of a network are connected to each other. Certain embodiments may automatically generate dependencies for a given network topology, without requiring any additional user input. Certain embodiments may automatically generate the dependencies by applying an algorithm upon a given network topology. With certain embodiments, a user may define a cluster/group of nodes, where dependencies exist between the nodes of the cluster/group. Certain embodiments may also be directed to determining a root node of each cluster/group of nodes, as described in more detail below. Certain embodiments may automatically generate the dependencies within each cluster/group, and may ensure that there are no conflicts and no inconsistencies within the generated dependencies.

Network devices, such as polling engines, may communicate with nodes within the network. A polling engine may communicate with the node to determine the status of the node, to determine operating characteristics of the node, and/or to determine availability of the node, for example. As dependencies are generated, the generated dependencies may correspond to a determined/ascertained path between a polling engine and a relevant node. The polling engine may use the path to reach the relevant node.

Figure 1:
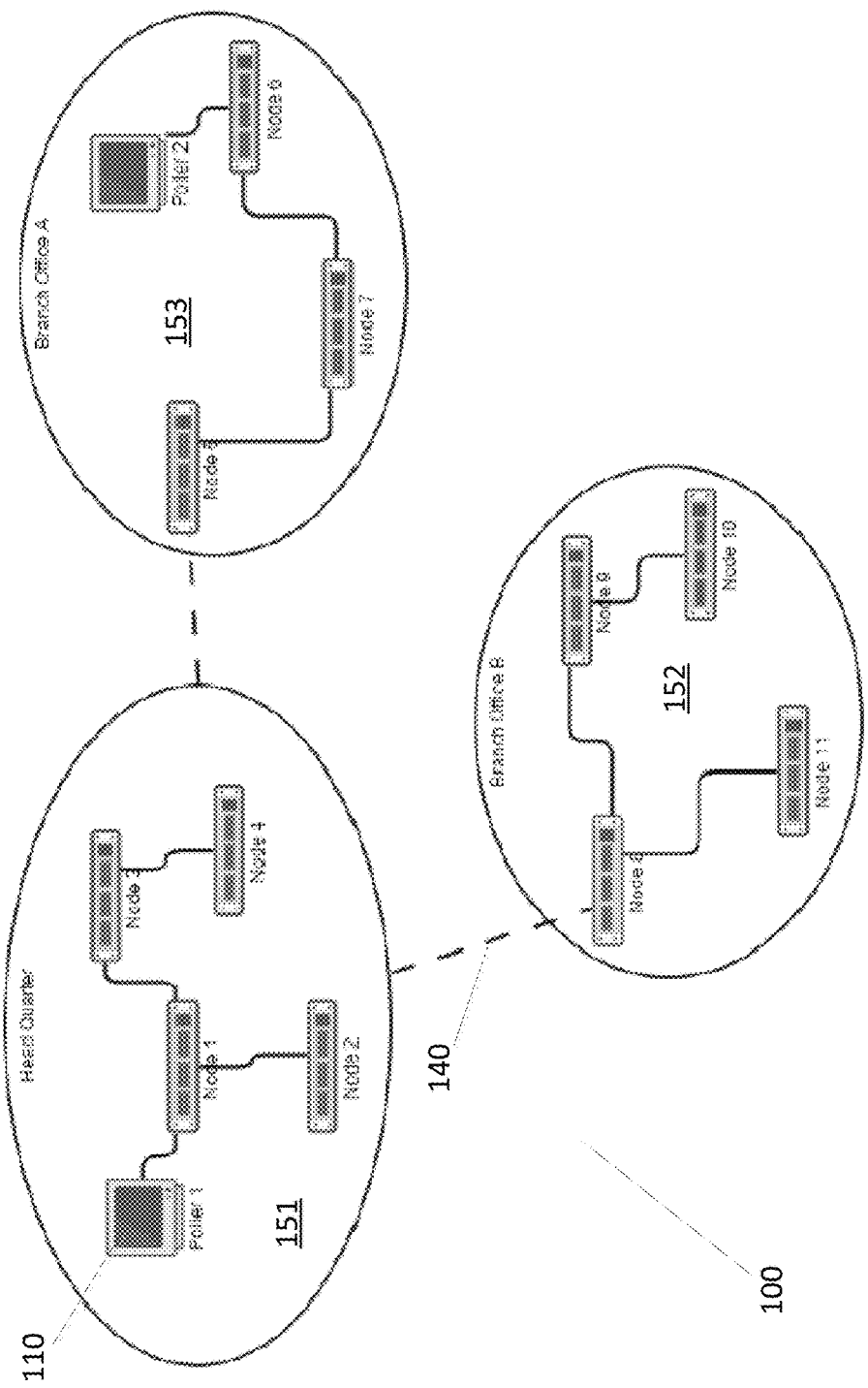
FIG. 1 illustrates an example network topology that includes a polling engine, in accordance with certain embodiments of the present invention.

FIG. 1 illustrates an example network topology 100 that includes a polling engine 110. As described above, a polling engine generally performs a checking of the status of network devices to determine what state the network devices are in, and/or performs a checking of whether the network devices are still in communication with the network. The network topology 100 may include a plurality of clusters (151, 152, and 153). Each cluster may correspond to a different portion of the overall network. One cluster may be a headquarter cluster, while another cluster may be a branch cluster. Certain connections/devices may not be immediately apparent. For example, the dotted line 140 indicates that the network devices/connections between the headquarter and branches are not visible in topology 100. The network devices between the headquarter and the branches may possibly not be monitored by the polling engines, because a user may possibly not have access to them. The user may possibly not have access to the network devices between the headquarter and the branches because a service provider may be in control of such network devices. Nodes may be connected inside each cluster, while there may be no visible connection between the clusters themselves.

Figure 2:
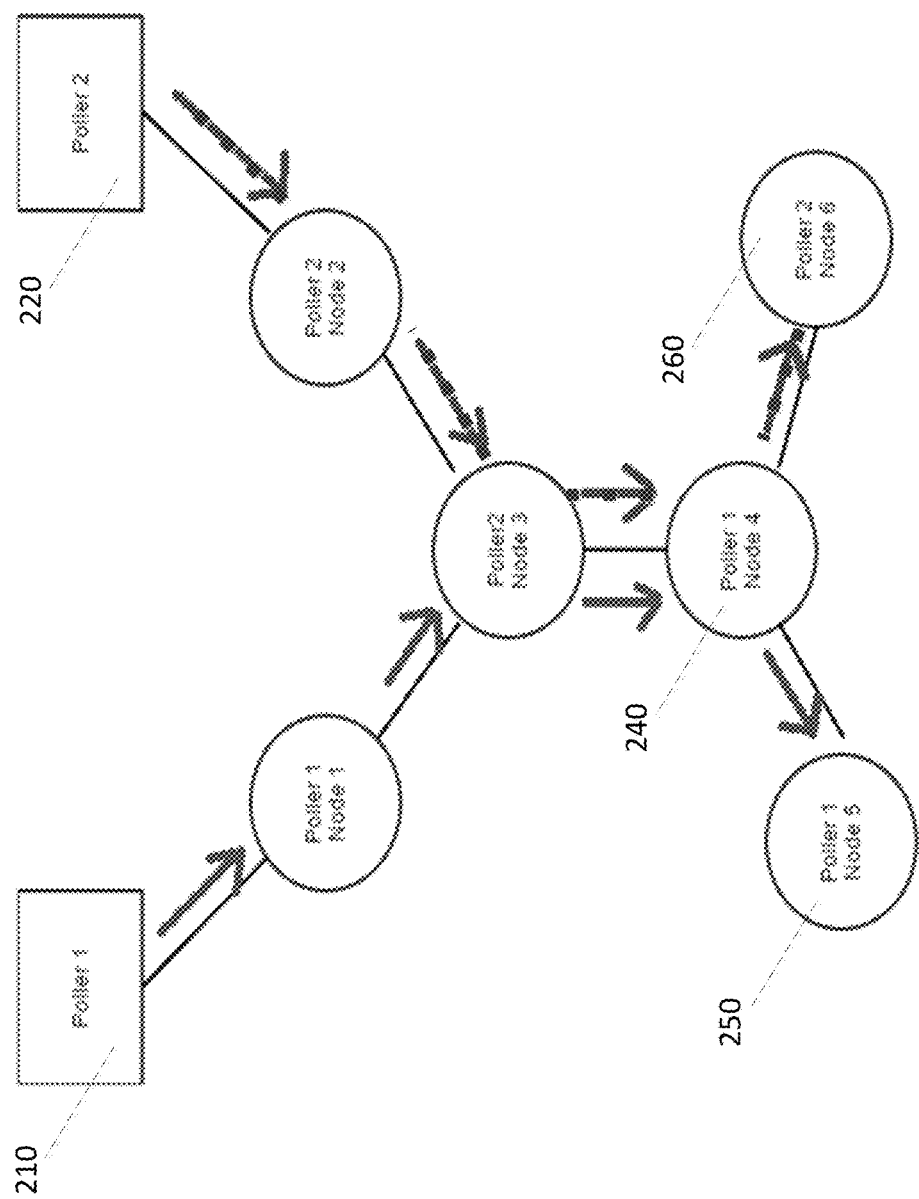
FIG. 2 illustrates paths between polling engines and network nodes, in accordance with certain embodiments of the present invention.

FIG. 2 illustrates paths between polling engines and network nodes, in accordance with certain embodiments. As described above, when automatically generating dependencies, the generating process may determine a path that a polling engine may follow to reach a network node. For example, polling engine 210 may follow a path to reach node 250. The path that is followed by different polling engines (210, 220) to reach a given node may be different. For example, the path from polling engine 210 to reach node 250 is different from the path from polling engine 220 to reach node 250. As such, certain embodiments may determine a path for each polling engine to reach each network node.

As such, when determining a path between a polling engine and a given node, each generated dependency (between two nodes, for example) may be a directional step in the path. There could be multiple paths from one polling engine to a given network node.

One type of dependency relationship between two nodes is a parent node to child node relationship, where the child node is dependent on the parent node. Referring again to FIG. 2, a parent node 240 has a plurality of child nodes (node 250 and node 260). In the event that parent node 240 goes down (such that parent node 240 cannot be reached or communicated with by the network), a child node 250 of the parent 240 may continue to be polled by the network. That is, polling engine 210 may still try to communicate with child node 250. Because child node 250 appears to also be down (as child node 250 is unreachable by polling engine 210 as a result of parent node 240 actually being down), the polling engines may activate network alerts to indicate that child node 250 is down. The polling engines may generate the alerts, and a user interface (UI) may display the alerts to a user. The user may utilize a web browser or a special tool (such as an Alert Central, for example) to view alerts. In the event that a polling engine cannot reach child node 250, the child node's associated dependencies are examined, and the child node's parent nodes or groups are derived from the examined dependencies. Then, if all of the child node's parent nodes are down, certain embodiments determine that the status of node 250 is unreachable. If alerts are configured to be generated when a node status changes to down, no alert is generated by the polling engine if the status of node 250 determined to be unreachable, as described above. If the dependencies are not determined, whenever the polling engine cannot reach the node 250, the status of node 250 will be considered to be down. Under this condition, if alerts are configured to be generated when a node status changes to down, then such alerts are generated by the polling engine.

However, in the event that a child node is unreachable due to the corresponding parent node being down, the activated alerts that relate to the child node should be ignored because the problem lies with the parent node. With certain embodiments, generating/activating alerts may include two steps. The first step is to determine the node status of the child node. The second step is to generate an alert when the conditions for generating the alert have been met. There are at least two ways to handle alerts. With a first way of handling alerts, the only alerts that are generated are alerts that are intended to be viewed by the user. With this approach, as specified above, when the node 250 cannot be reached by a polling engine and all of its parent nodes are down, its node status is unreachable. Therefore, no alert is generated for this unreachable node, because the condition for generating the alert is a node status that is down. When a node status changes to unreachable, the condition for generating the alert has not been satisfied, and thus no alert is generated. With a second way of handling alerts, the alert is first generated, and then the generated alert is ignored if the user should not view the generated alert. It is possible to generate an alert when the polling engine cannot reach the node 250, and then ignore the alert when further processing indicates that the parent nodes of node 250 are all down. In such an event where some generated alerts are to be ignored, the activated alerts that relate to the child node should be ignored by the polling engines in order to avoid flooding the network with activated alerts. The polling engines should also avoid activating network alerts for the child node.

A parent node may be a central node (such as, for example, an edge router). As described above, when a central node of a network is down, a polling engine may be unable to reach/communicate with the nodes that are configured behind (i.e., that are configured to be dependent upon) the downed central node.

As described above, activated alerts that relate to nodes that are configured behind the downed central node should be ignored by the polling engines, in order to avoid a flood of alerts. As such, certain embodiments may first identify the dependent nodes by identifying the nodes that are configured behind the central node. Certain embodiments may then generate alerts for only the central node, as opposed to generating alerts for all the nodes that are configured behind the central node.

In view of the above, when a node is unreachable, certain embodiments may determine all of the parents of this unreachable node based on the dependencies that are known by the polling engine (that is, the polling engine that is assigned to the unreachable node). If any of the parents (of the node) is up/reachable, then the status of the unreachable node is considered as "down." On the other hand, if all of the parents are down, then the status of the node will be considered as merely "unreachable," and activated alerts from such a node may be ignored. With certain other embodiments, if all of the parents are down for an unreachable node, then no alerts are generated for the unreachable node.

Certain embodiments may perform/execute an algorithm in order to automatically generate network dependencies upon demand, or in accordance with a regular interval so that the generated dependencies are up-to-date. Certain embodiments may also allow the user to manually add dependencies. Although manual configuration of dependencies is typically tedious, and although manual configuration typically cannot properly adapt to a changing network topology, certain embodiments of the present invention may provide an efficient method to implement manual configuration. Specifically, certain embodiments may integrate functionality that automatically generates dependencies along with functionality where a user configures dependencies. With certain embodiments, dependencies that are user-defined/user-configured may take precedence over dependencies that are automatically generated.

Upon generating dependencies, as described above, certain embodiments may suppress certain alerts, may derive topology-based groups, and may report node availability. With regard to deriving topology-based groups, a user may want to define a group that contains all nodes that depend directly or indirectly (recursively) on a specific node. With automatically determining dependencies (i.e., "auto dependency"), certain embodiments may determine all dependencies that this node is a parent to, directly or recursively, and then all children in those dependencies are in this group. A user can assign access permissions to this group to an account, or define alert conditions based on the group status, for example. This allows the user to manage the network devices on the group level, instead of on the node level. As described above, the generated dependencies may be used to determine a proper node status (i.e., regarding whether the node status is "down" or merely "unreachable").

The algorithms of certain embodiments may handle a scenario with a plurality of polling engines.

Each node may be assigned to different polling engines, and the assignment between the nodes and the polling engines may change over time. At any moment, a node is generally assigned to a single polling engine. It is generally not possible that the user assign more than one polling engine to poll data from a given node. At a different time, the user can change the configuration, and let another polling engine to poll the given node.

Figure 3A:
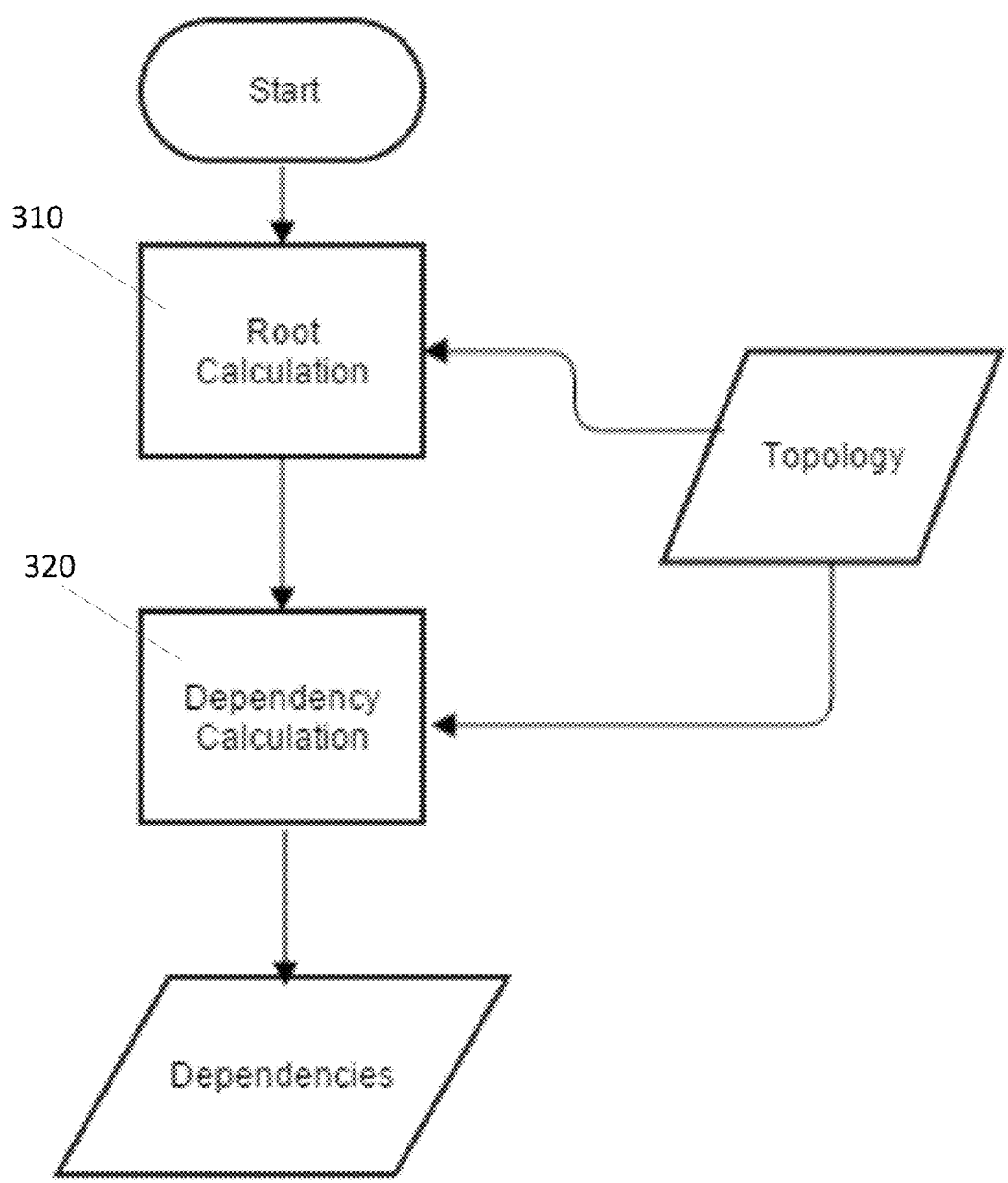
FIG. 3(a) illustrates determining a central node/root and a dependency of a cluster, in accordance with certain embodiments of the present invention.

FIG. 3(a) illustrates determining a central node/root and a dependency of a cluster, in accordance with certain embodiments. Topology connections may be an input of the calculations of certain embodiments, and the auto-generated dependencies may be the output. Certain embodiments may determine node clusters, where the nodes within a cluster are connected. Certain embodiments may, at step 310, determine the root node of each cluster. For each polling engine, certain embodiments may determine the root node of each cluster. The root node may correspond to a node that other nodes of the cluster are dependent upon, such as a parent node, for example. The root nodes may then be saved within an AutoDependencyRoot table. In order to determine the root node of a cluster, the process of automatically generating dependencies may first determine a node that is closest to a particular polling engine, which is then determined as the root of the cluster. The process may then build/generate dependencies within each cluster, starting from the determined root node. In other words, certain embodiments may determine a path from the determined root node to the other nodes in the cluster. The dependencies may then be saved within a Dependencies table, as described in more detail below.

With regard to manually configuring dependencies, certain embodiments may allow users to manually adjust dependencies by adding dependencies that are missing from the collection of generated dependencies. Certain embodiments may also correct wrong auto-generated dependencies. For example, if the topology connections are wrong for any reason (where, for example, node 1 is not connected to node 2, but the topology data shows node 1 is connected to node 2), then auto-generated dependencies could be wrong, or the direction of the dependency could be wrong. The user can correct this by adding user-defined dependencies. Users may also ignore unwanted dependencies. With certain embodiments, the user may adjust the calculations performed by the automatic generation process to: (1) allow user-configured dependencies to take precedence over automatically generated dependencies, and/or (2) avoid generating cyclic dependency loops between the user dependencies and the automatically-generated entries. A cyclic dependency loop corresponds to a series of dependencies where each node is dependent upon another node in the same series of dependencies.

Figure 3B:
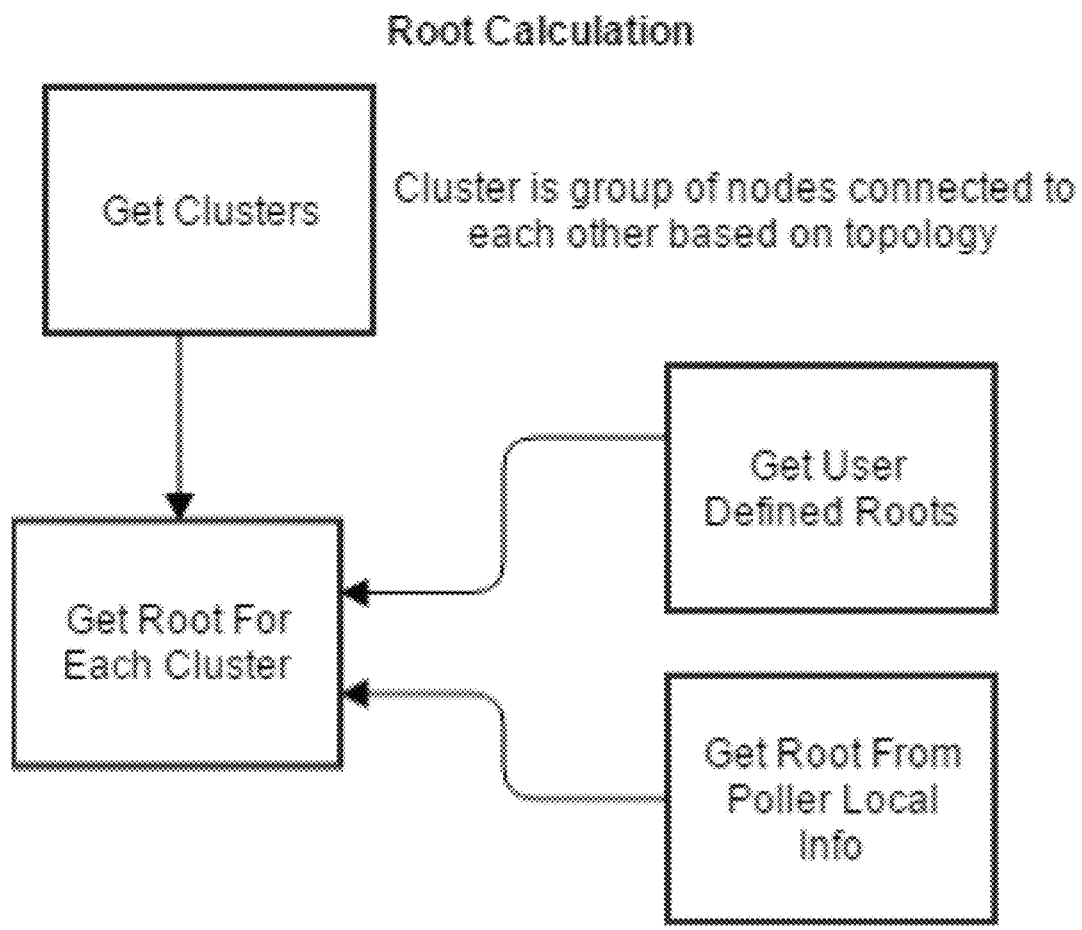
FIG. 3(b) illustrates determining roots for each cluster/group of nodes, in accordance with certain embodiments.

FIG. 3(b) illustrates determining roots for each cluster/group of nodes, in accordance with certain embodiments. First, certain embodiments may determine a group/cluster of nodes. A cluster may include nodes that are connected to each other based on a topology. There may be no connection (as reflected by the topology) between a node in one cluster and another node in a different cluster. Second, certain embodiments may determine the root for each cluster in accordance with the following process (as soon as a root is determined, the processing may stop). Certain embodiments may determine a user-defined root for a given cluster. For example, certain embodiments may get a root from an Address Resolution Protocol (ARP) table. Certain embodiments may also get the root from a default gateway of a polling engine. When determining the root of a particular cluster, certain embodiments may trace a route from the polling engine to a node in the cluster. The node that is closest to the polling engine may be determined to be the root of the cluster. For example, referring to FIG. 1, Poller 1 may be in Head Quarter, and certain embodiments may determine the root for Poller 1 in cluster "Branch Office B." Poller 1 may issue a trace route to Node 10, and the path of the trace route may include "Poller1, Node 1, Node 2, Node 8, Node 9, Node 10." As such, Node 8 may be the root for Poller 1 in cluster "Branch Office B," because Node 8 is the closest node to poller 1, from within "Branch Office B."

Figure 3C:
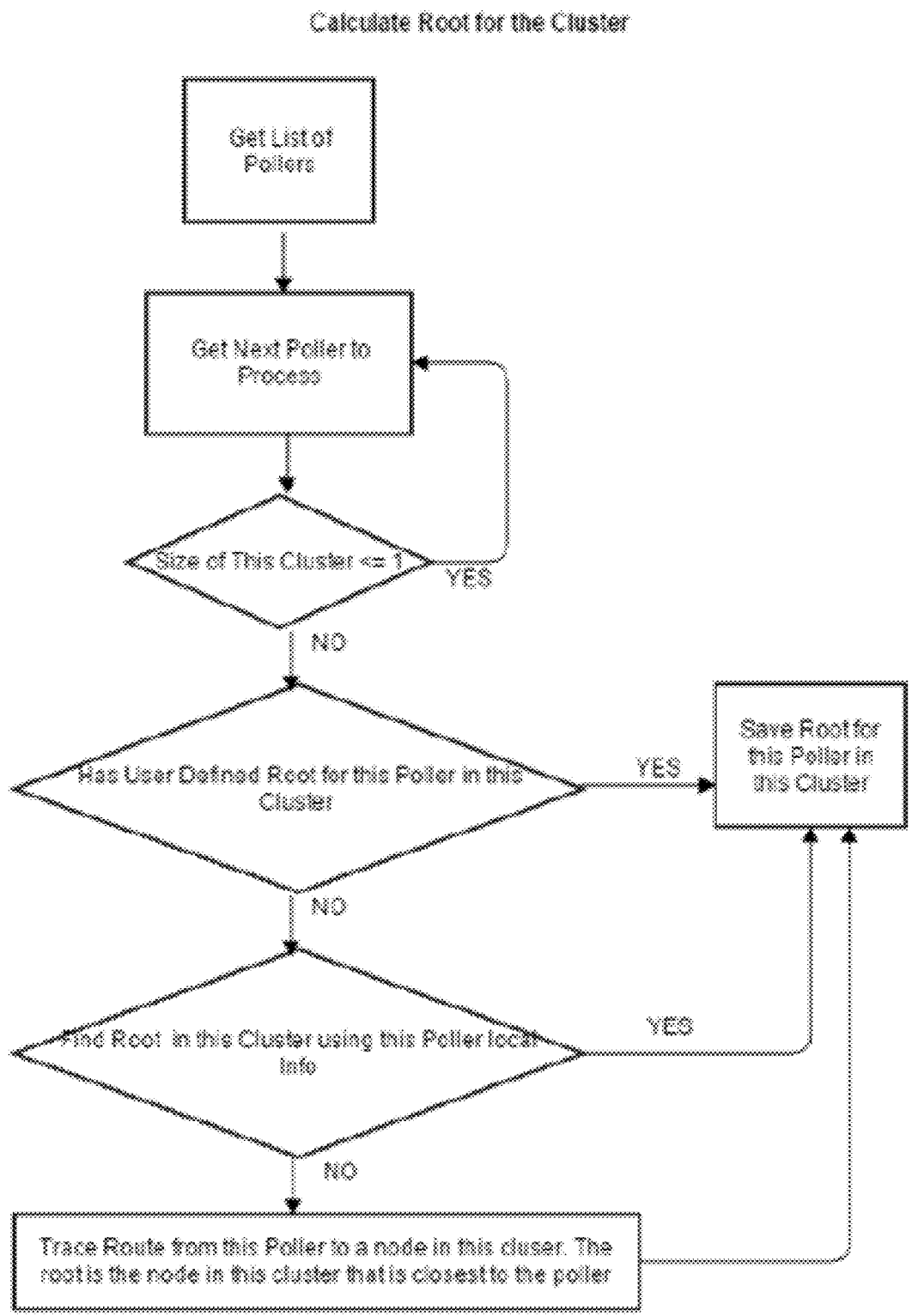
FIG. 3(c) illustrates an example procedure for calculating a root for a cluster, in accordance with certain embodiments.

FIG. 3(c) illustrates an example procedure for calculating a root for a cluster, in accordance with certain embodiments. First, certain embodiments may determine the pollers of a topology from a list of pollers. Next, certain embodiments may determine a poller to process from the list of pollers. Certain embodiments may process a poller which polls a cluster with more than one node within the cluster. If there is a user-defined root for the poller in the cluster, then the user-defined root may be determined to be the root for this poller in this cluster. If there is not any user-defined root, then certain embodiments may determine a root of the cluster using local information from the poller. As described above, certain embodiments may also use a trace route to determine a root of the cluster.

Figure 3D:
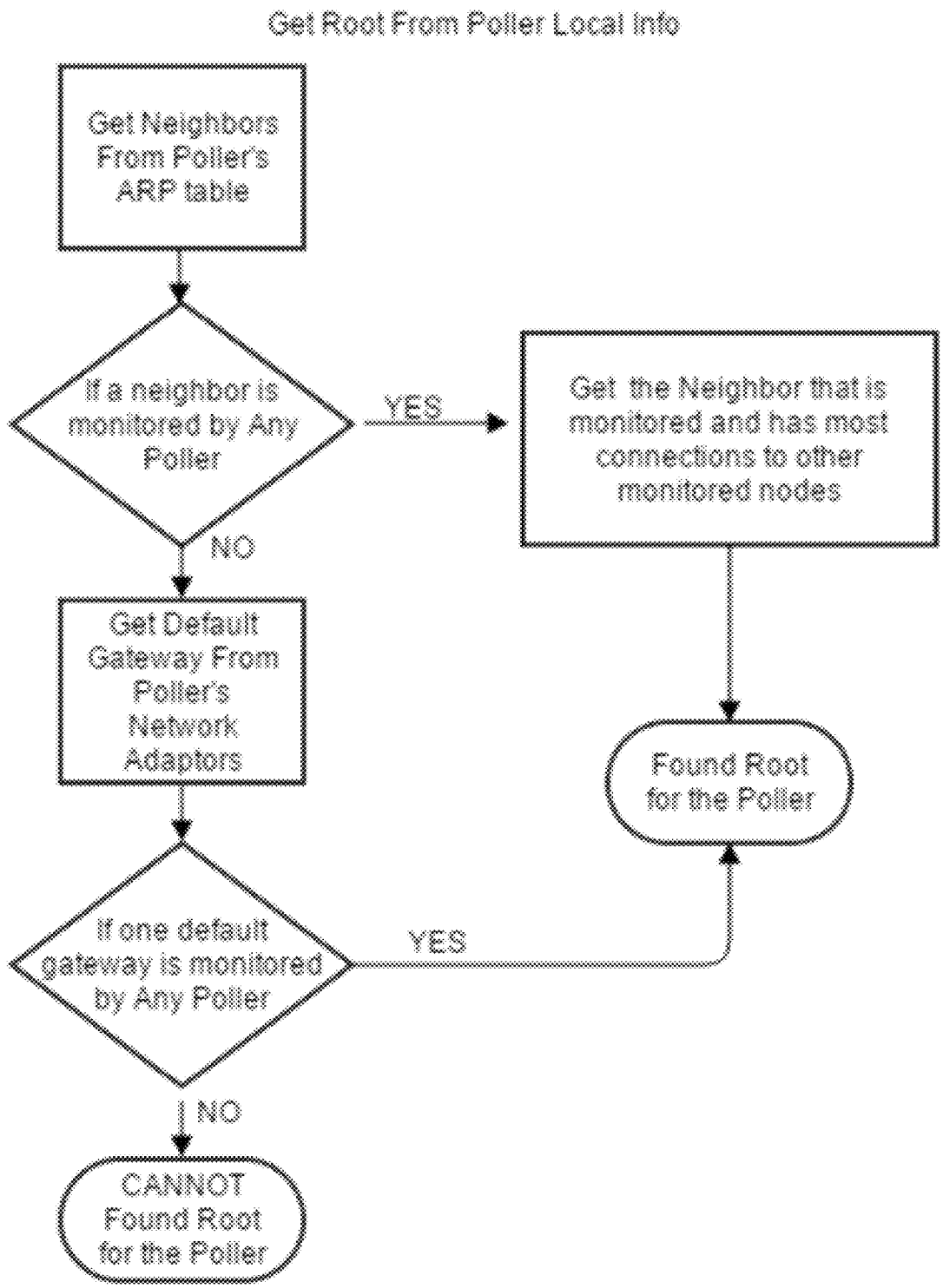
FIG. 3(d) illustrates determining a root from poller local information, in accordance with certain embodiments.

FIG. 3(d) illustrates determining a root from poller local information, in accordance with certain embodiments. First, nodes that neighbor a poller may be determined from the poller's ARP table. Next, if neighboring nodes are monitored by pollers, certain embodiments determine the neighboring node that is monitored and that has the most connections to other monitored nodes. This neighboring node may be considered to be the root for the poller. Alternatively, if one default gateway is monitored by a poller, then the default gateway may be considered to be the root for the poller.

Figure 4:
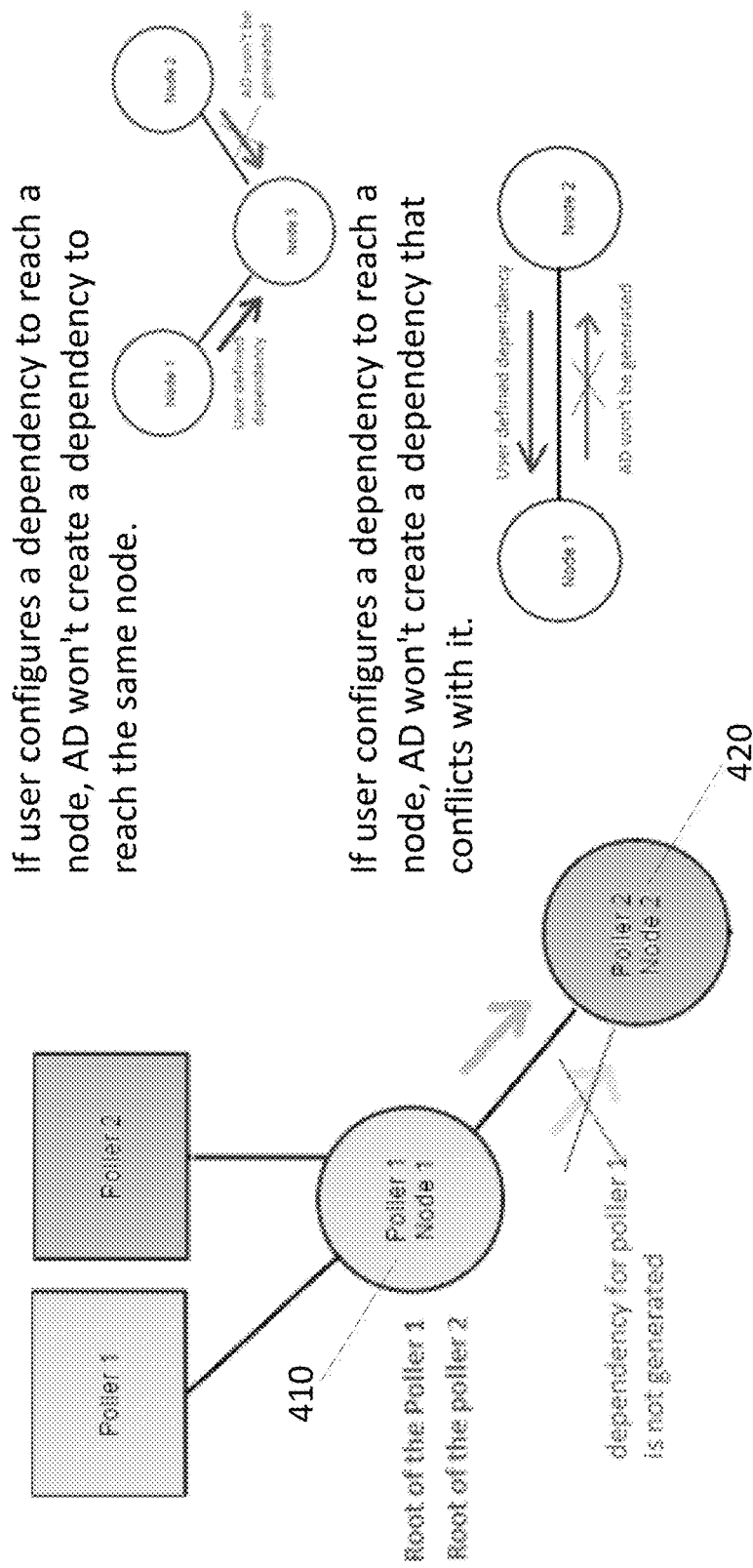
FIG. 4 illustrates a process of automatically generating dependencies, while avoiding generating a dependency that conflicts with a user-defined dependency.

FIG. 4 illustrates a process of automatically generating dependencies, while avoiding generating dependencies that conflict with a user-defined dependency. In the event that a user defines a node 420 as being dependent on node 410, then the automatic generation process of certain embodiments would avoid duplicating this user-defined dependency. Referring to FIG. 4, suppose that Node 3 is established as a dependent node of Node 1 (a dependency is established between Node 3 and Node 1), then certain embodiments will avoid generating a dependency between a Node 2 and Node 3. The dependency between Node 2 and Node 3 is avoided because Node 3 is already reachable via the dependency with Node 1. Further, the automatic generation process of certain embodiments would also avoid generating a dependency that conflicts with the user-defined dependency. For example, referring again to FIG. 4, if Node 1 is determined to be dependent upon Node 2, then certain embodiments will avoid generating a dependency where Node 2 is dependent upon Node 1.

Certain embodiments may ensure that no cyclic dependency loop is formed within the dependencies. Certain embodiments may also minimize the number dependencies that are generated by retaining only those dependencies that are useful/relevant to a polling engine in a single pass. A single pass may generally mean that a node is processed only once for generating the dependencies and minimizing the number of dependencies. The alternative is to first process the given node for generating the dependencies. Once the processing for all nodes is done, then the same node is processed again to remove the dependencies that are not useful, to minimize the number of dependency. The alternative may require two-passes and may require holding all generated dependencies in memory (which may result in a high memory requirement) or saving the generated dependencies into a database and then removing them, which may cause substantial database updates and cause performance problems. The details of single-pass processing is described below. Dependencies may be determined as being useful/relevant, as described in more detail below.

A dependency may be determined to be useful/relevant to a polling engine if the dependency is within a path that connects the polling engine to a node that is assigned to this polling engine. The dependency is not useful/relevant to a polling engine, if none of the dependency's children (and/or the dependency's recursive children) is a node that is assigned to the polling engine. If the dependency is not useful/relevant to the polling engine, then the dependency may be safely removed. When a node does not respond to a polling request from its assigned polling engine, the removed dependency will not be used to determine if the node is down or unreachable due to a down parent.

When each dependency is generated, the dependency may or may not be useful. As such, a generated dependency may need to be stored until all of the children of the dependency has been processed, or until one of the children is assigned to the relevant polling engine. As such, a generated dependency may need to be held in memory. Whether or not a generated dependency is useful may be unknown until all of the children (that are assigned to this polling engine and are children of the parent node of the dependency) have been processed, or until one of the children is assigned to the relevant polling engine. Certain embodiments may determine when all of the children of a parent node have been processed because certain embodiments may track how many nodes assigned to this polling engine within this cluster have been processed, and certain embodiments may know the total number of nodes in this cluster that are assigned to this polling engine. After all of the children of a dependency have been processed, certain embodiments may then ascertain whether any of the children are assigned to a given polling engine, and thus may determine whether the dependency is itself useful to the given polling engine. When one of the children is determined to be assigned to the relevant polling engine, the dependency may be determined to be useful. If all of the children of the dependency have been processed, and none of the children are determined to be assigned to the relevant polling engine, then the dependency may be determined to not be useful.

In view of the above, certain embodiments may calculate/generate the dependencies within a cluster for a given polling engine, and certain embodiments may calculate/generate the root node in the cluster.

Figure 5:
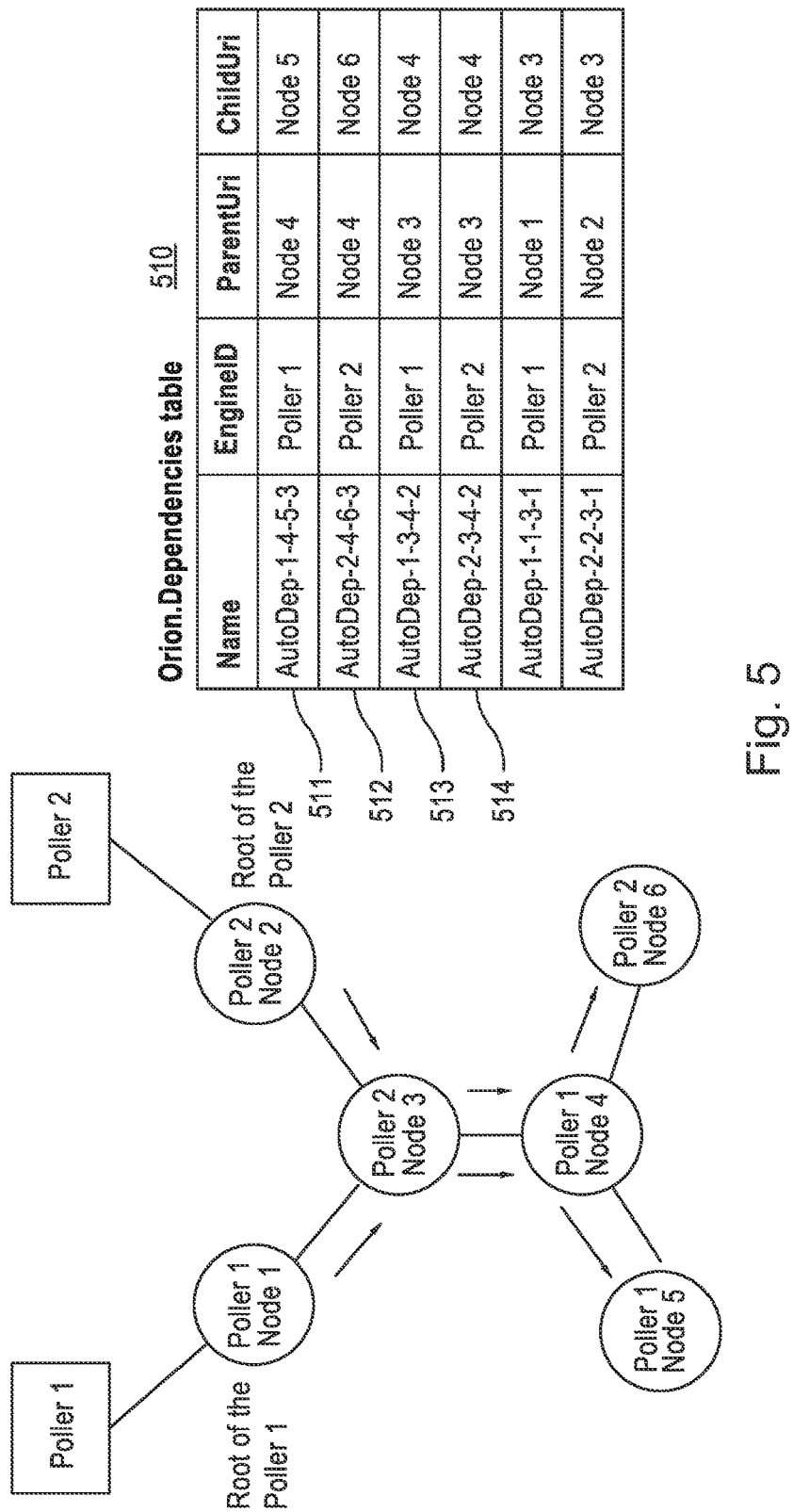
FIG. 5 illustrates storing generated dependencies within a table, in accordance with certain embodiments of the present invention.
Figure 12:
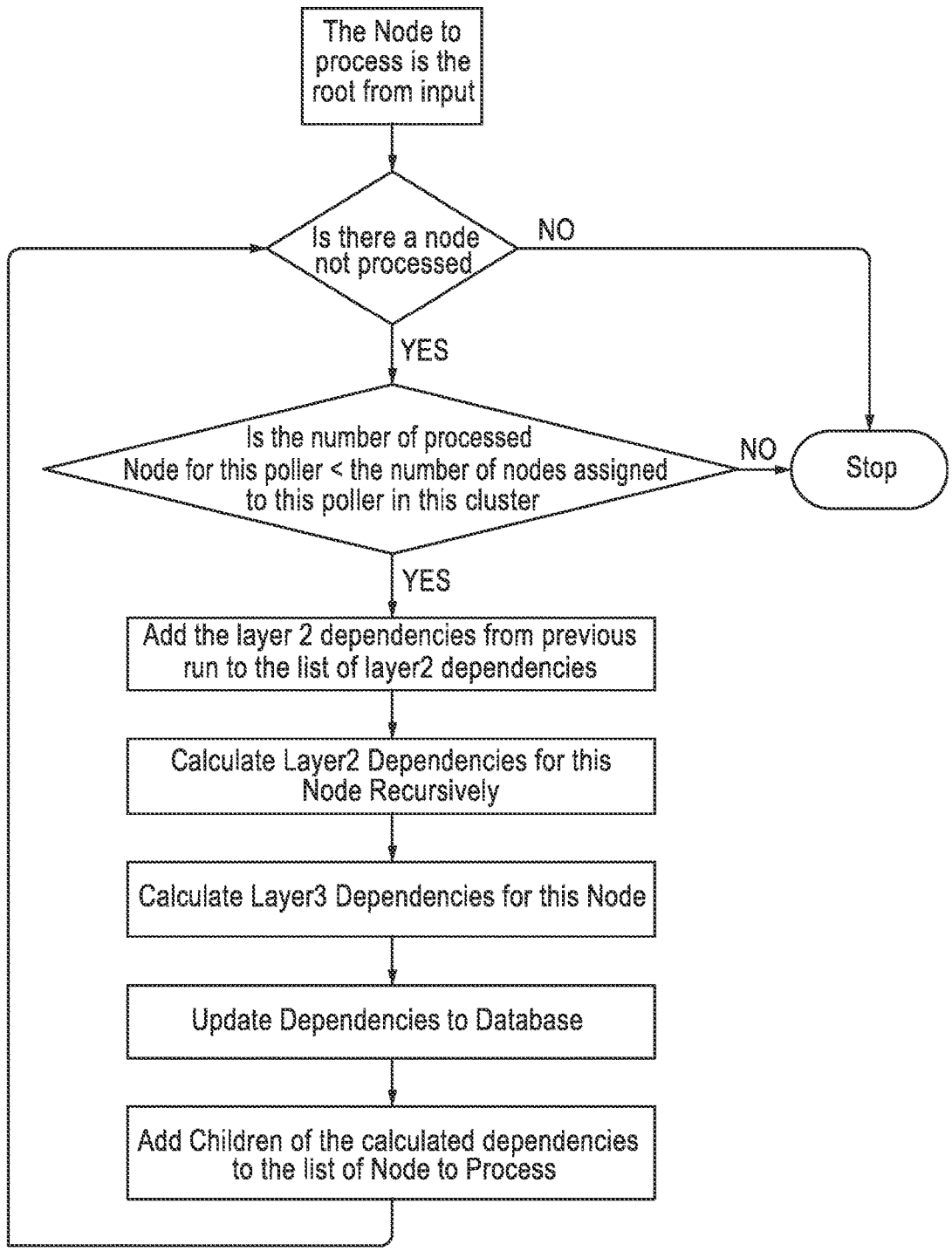
FIG. 12 illustrates calculating dependencies of a cluster, for a given poller, in accordance with certain embodiments of the invention.

Certain embodiments may perform filtering based on a future input. Certain embodiments may integrate a layer 2 and a layer 3 path to generate dependencies that closely resemble the realities of the network. A layer2 connection shows more details on how nodes are connected, but the nodes are not continuous. Layer3 shows less details on how nodes are connected, but they are continuous in a cluster. For example, in FIG. 2, a layer2 connection shows that Node 3 is connected to Node 4, and Node 4 is connected to Node 5. The layer2 connection does not show that Node 1 is connected to Node 3, because both Node 1 and Node 3 are routers. Layer3 connection only shows that Node 3 is connected to Node 5 directly because Node 4 is a switch and is not visible in Layer3 connection. The actual path from Node 3 to Node 5 is from Node 3 to Node 4 and then to Node 5. FIG. 12 shows how to construct the whole path using both Layer2 connections and Layer3 connections Certain embodiments may automatically handle a situation where the network is a discontinuous network. A discontinuous network may generally refer to a network that is not entirely accessible/controllable to a user. A portion of the of the network may not be entirely accessible/controllable to the user because the portion may be controlled by a service provider, for example. To handle a situation where the network is a discontinuous network, certain embodiments may find a root for each polling engine and each cluster, as described above. FIG. 5 illustrates storing generated dependencies within a table 510. Upon enabling of the automatic generation of dependencies, the dependencies (511, 512, 513, 514, etc.) may be promptly generated. The newly generated dependencies may appear in a table 510 (such as, for example, an Orion.Dependencies table). Upon disabling the automatic generation of dependencies, the dependencies which were previously generated may be promptly removed from the Orion.Dependencies table. When settings are changed to either disable or enable the automatic generation of dependencies, the change of the settings may trigger an auditing event.

Figure 6:
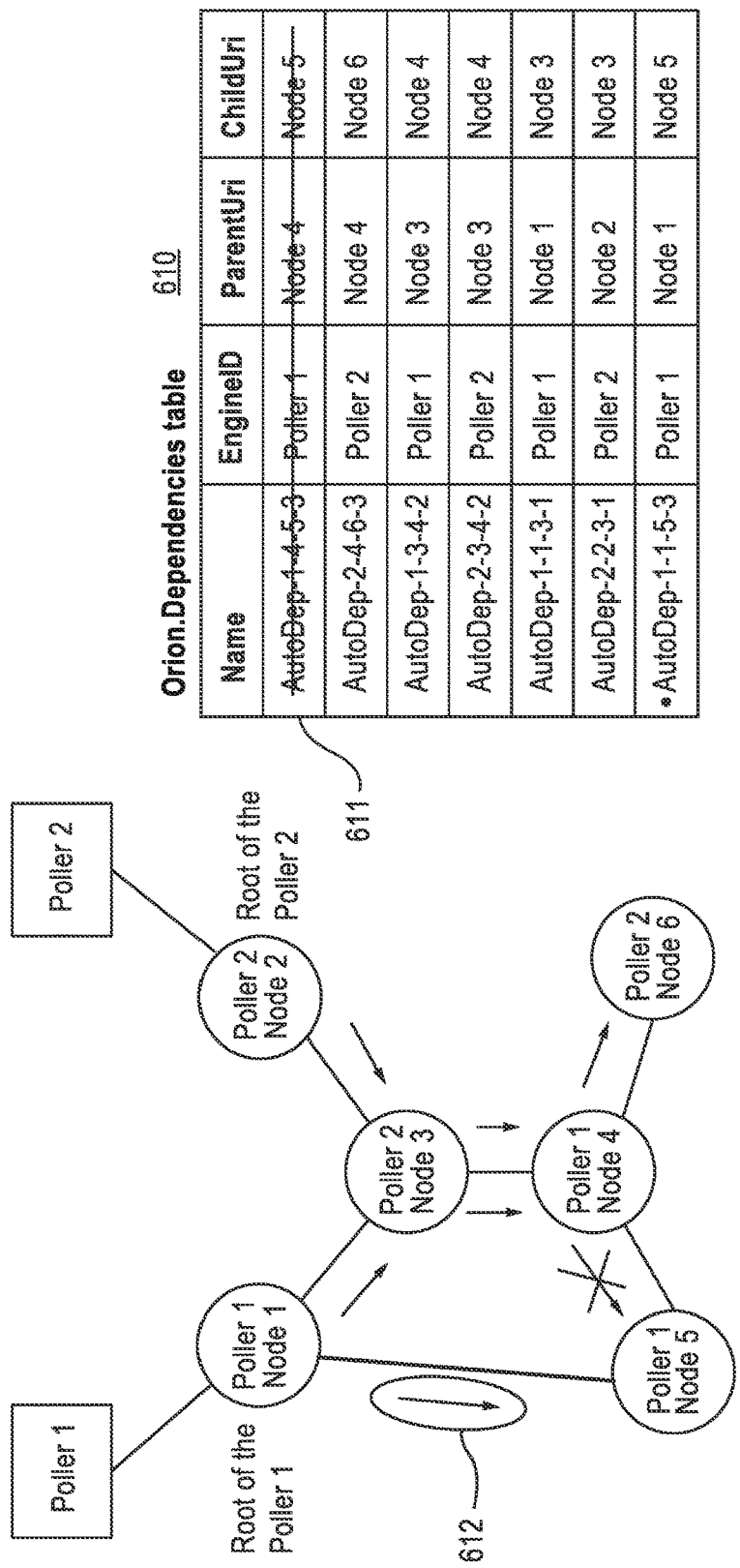
FIG. 6 illustrates removing entries corresponding to dependencies, in accordance with certain embodiments of the present invention.

FIG. 6 illustrates removing entries of dependencies, in accordance with certain embodiments of the present invention. Certain embodiments may allow a user to manage the dependencies which are automatically generated. Certain embodiments may not allow the user to edit nor allow the user to delete dependencies that are automatically generated. However, the user may ignore certain dependencies. Ignored entries (such as entry 611) may be removed from the Orion.Dependencies table 610. The user may decide if an auto-generated entry should be ignored (not shown in Dependencies table). For example, the user may decide to ignore an auto-generated entry if the user knows that such a dependency does not exist. For example, the user may know that Node 4 is not connected to Node 5, but the topology may be wrong, and the incorrect topology may include a connection between Node4 and Node5. Then, when Auto Dependency generates entry 611, the user can correct this problem by ignoring entry 611. If there is a connection between Node 4 and Node5 that indicates that Node 5 depends upon Node 4, but Node 4 actually depends on Node5, then the user can correct this problem by adding a user-configured dependency (where the parent is Node 5, and the child is Node 4). Entry 611 may be ignored because the entry may correspond to a dependency that is duplicative of dependency 612. A dependency that is ignored will not affect the statuses of the nodes that relate to the ignored dependency. The ignored dependencies may be shown under a tab "Manage Ignored Dependencies" 730 of FIG. 7, for example.

Figure 7:
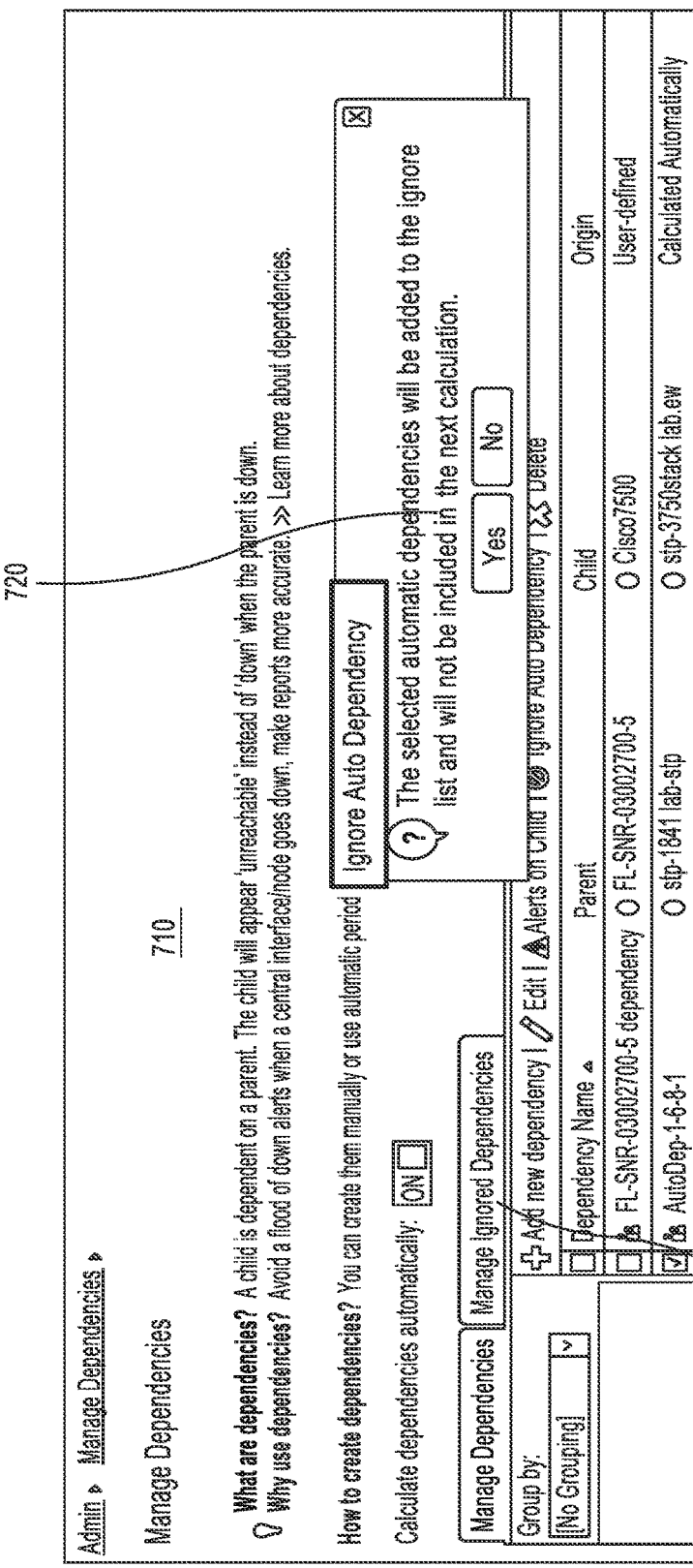
FIG. 7 illustrates an interface that allows a user to ignore an automatically generated dependency, in accordance with certain embodiments of the present invention.

FIG. 7 illustrates an interface 710 that allows a user to ignore an automatically generated dependency. Interface 710 allows the user to manage dependencies. Interface 710 may include a window 720 that allows a user to ignore one or more automatically-generated dependencies.

Figure 8:
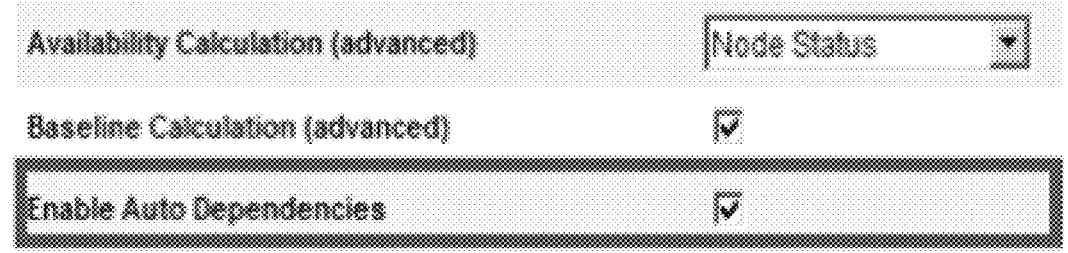
FIG. 8 illustrates an interface that allows a user to enable or disable a method of automatically generating dependencies, in accordance with certain embodiments of the present invention.

FIG. 8 illustrates an interface 810 that allows a user to enable or disable a method of automatically generating dependencies, in accordance with certain embodiments. With certain embodiments, the process of automatically generating dependencies may be enabled or disabled by a user with administrator rights. The user may enable/disable the functionality via a Polling Setting page/Manage Dependencies page, for example.

With certain embodiments, the automatic generation of dependencies may be enabled if the network topology allows for the automatic generation of dependencies. Certain embodiments may allow a user to remove the ignored auto-generated dependencies. However, as a result of removing the ignored auto-generated dependencies, these auto-generated dependencies may be re-added/relisted in the Orion.Dependencies table upon the performing of a subsequent calculation/generation process, and the ignored auto-generated dependencies may then become active again.

With certain embodiments, an auditing event may be generated when the user ignores the automatically-generated dependencies or when the user removes an ignored automatically-generated dependency. One example of the auditing event relates to creating an event for the action and add it to the event log. So, the user can view and log events and notice the actions that changed the dependencies. Therefore, the action may be recorded in history, and can be audited later on.

With regard to the functionality of automatically-generating dependencies, the following configuration information may be stored in a database as follows. First, an entry may indicate whether or not an automatic-generation functionality is enabled. The entry (such as "SWNetPerfMon-Settings-AutoDependency") may be enabled or disabled.

Each of the dependencies may be stored with some or all of the following parameters. One parameter of each dependency may be an "AutoManaged" parameter. This parameter may indicate whether the corresponding dependency/entry was automatically generated (i.e., where the parameter is set to "true"), or whether the corresponding dependency/entry was user/manually defined (i.e., where the parameter is set to "false").

Another parameter of each dependency may be an "EngineID" parameter. This parameter may indicate the polling engine to which the dependency is associated with. With certain embodiments, user-defined dependencies may be associated to all polling engines. An automatically-generated dependency may generally be associated with one polling engine.

Another parameter for each dependency may be a "category" parameter. This parameter may indicate the type of dependency.

Certain other parameters may be added for each dependency, for performance reasons. These other parameters may include ParentEntityType, which indicates an entity type of a parent node of the dependency. Another parameter may include ParentNetObjectID, which indicates an identifier of the parent object of the dependency. Another parameter may include ChildEntityType, which indicates an entity type of a child node of the dependency. Another parameter may include ChildNetObjectID, which indicates an identifier of the child object of the dependency.

With certain embodiments, a new table may be an "AutoDependencyRoot" table. This table may be used when calculating dependencies. This table may contain the root node that is calculated for each polling engine and cluster. Certain embodiments may also include a "DeletedAutoDependencies" table. This table may contain the ignored auto-generated dependencies.

Figure 9:
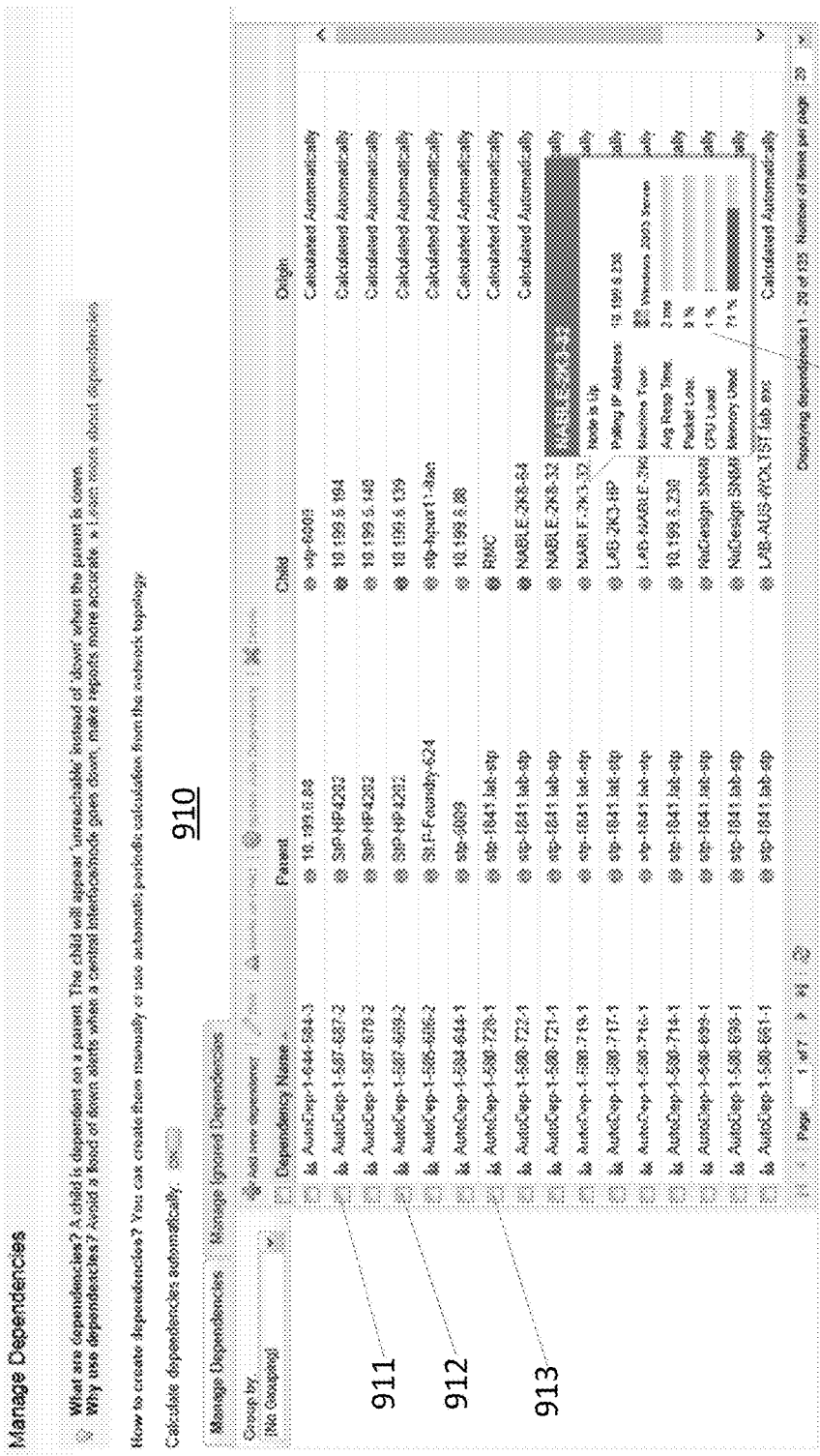
FIG. 9 illustrates an example interface that allows a user to manage different dependencies which have been user-configured and which have been automatically generated, in accordance with certain embodiments of the present invention.

FIG. 9 illustrates an example interface 910 that allows a user to manage the different dependencies which have been user-configured and which have been automatically generated. Each entry 911, 912, 913 of interface 910 may correspond to a different dependency. A popup window 915 may illustrate the operating characteristics/availability of each dependent node of each dependency.

FIG. 10 illustrates an example dependency tree. With certain embodiments, a user may view the dependencies which have been generated by using the visualized dependency tree. The user may then determine if some of the automatically generated dependencies should be ignored. Each entry within the example dependency tree may correspond to a dependency, and each entry may include a name/identifier of the dependency, the parent node of the dependency, and the child node of the dependency.

Figure 11:
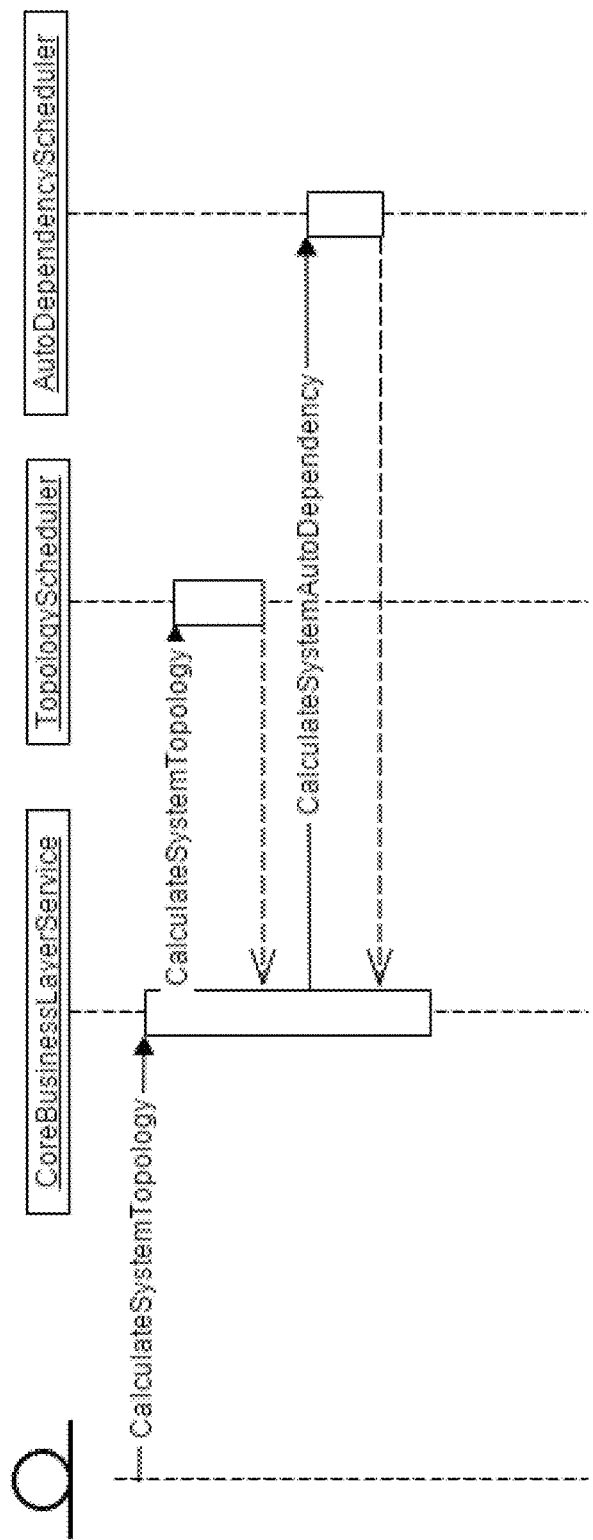
FIG. 11 illustrates a process for calculating a topology and determining an autodependency, in accordance with certain embodiments of the invention.

FIG. 11 illustrates a process for calculating a topology and determining an autodependency, in accordance with certain embodiments of the invention. At step 1, the user may trigger the calculation (such as an on demand calculation, for example) or a timer may trigger the calculation (such as a periodical calculation, for example). At step 2, the topology may be calculated, and the topology connections may be stored into the TopologyConnections table. At step 3, the dependencies may be automatically calculated based on the topology connections generated from step 2.

FIG. 12 illustrates calculating dependencies of a cluster, for a given poller, in accordance with certain embodiments of the invention. As described above, certain embodiments may integrate a layer 2 and a layer 3 path to generate dependencies that closely resemble the realities of the network. FIG. 12 shows the processing flow for a given polling engine and cluster, and shows how to combine layer 2 and layer 3 connections to generate detailed dependencies to form a path from the polling engine to all nodes in a cluster. The calculation starts from the root of the cluster for a given polling engine. All of the nodes that are directly connected to the root are its children. The dependencies that use layer2 connections are calculated first recursively for N steps (the default value of N may be 3 steps, for example). Then dependencies using layer3 connections are calculated. If a node can be reached by dependencies derived from layer2, no dependency will be derived from layer3 to reach such a node. For example, in FIG. 2, based on layer 2 connection, Node 3 has child Node 4 (AutoDep-1-3-4-2), and Node 4 has child Node 5 (AutoDep-1-4-5-3). Then, based on the layer 3 connection, Node 3 has child Node 5 (AutoDep-1-3-5-2, this dependency may be ignored because the polling engine can reach to Node 5 through Node 4 using a layer 2 derived dependency). Layer 2 dependencies may take precedence over layer 3 dependencies because layer 2 provides more details of the connectivity.

The condition that checks the number of processed nodes for this poller seeks to minimize the number of dependencies when all nodes assigned to this polling engine are processed, and no more useful dependencies could be generated.

Figure 13:
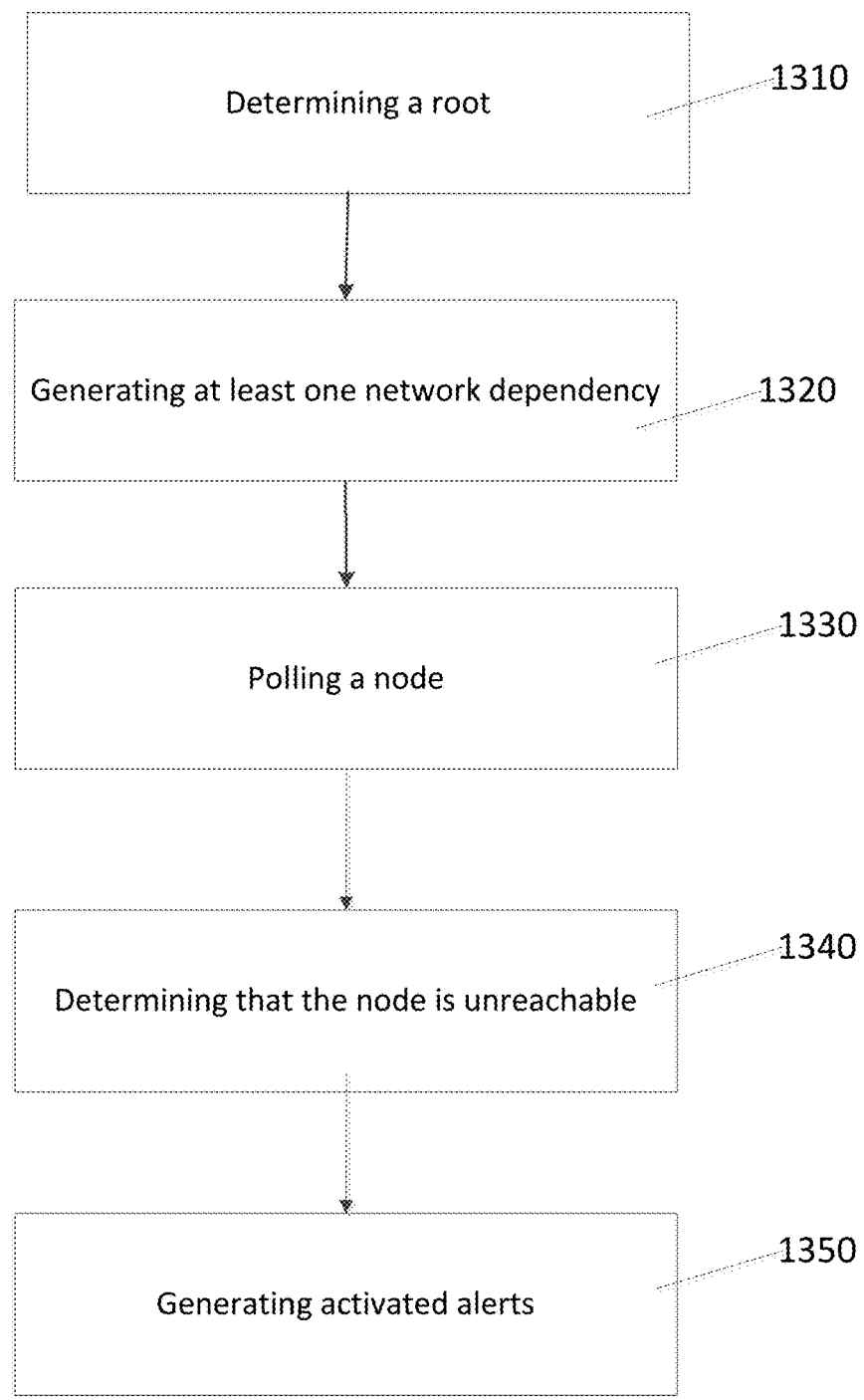
FIG. 13 illustrates a flowchart of a method in accordance with certain embodiments of the invention.

FIG. 13 illustrates a flowchart of a method in accordance with certain embodiments of the invention. The method illustrated in FIG. 13 includes, at 1310, determining, by a polling engine, a root. The root comprises a first node within a cluster of nodes of a network. The method may also include, at 1320, generating at least one network dependency between the root and a second node. The at least one generated network dependency corresponds to a connection between nodes of the network. The at least one generated network dependency corresponds to a directional path from the polling engine to the second node. The method may also include, at 1330, polling the second node. The polling occurs via the at least one network dependency that has been generated between the polling engine and the second node. The method may also include, at 1340, determining that the second node is unreachable. With certain embodiments, the polled second node may be determined to be unreachable after the polling engine sends out a request and does not receive a response before timeout occurs. The method may also include, at 1350, generating activated alerts relating to the unreachable second node, if any of the parent nodes of the second node are determined to be reachable by the polling engine. Certain embodiments do not generate alerts related to the unreachable polled node, if none of the parent nodes of the parent node are reachable.

Figure 14:
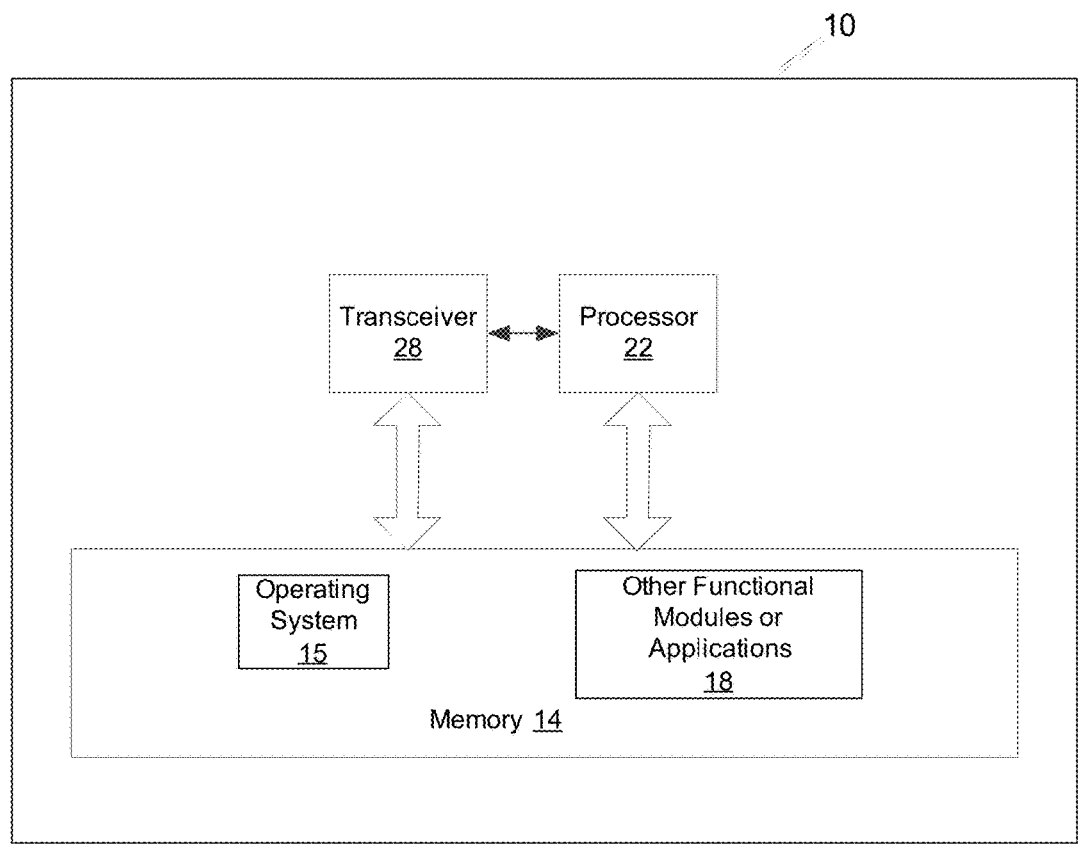
FIG. 14 illustrates an apparatus in accordance with certain embodiments of the invention.

FIG. 14 illustrates an apparatus in accordance with certain embodiments of the invention. In one embodiment, the apparatus can be a network node configured to perform the functions of a polling engine, for example. The polling engine may be on a server. The polling engine may or may not be a network device. The polling engine may be an end host. The polling engine may perform the function of determining the network dependencies. If there are multiple polling engines in the system, only one polling engine may need to calculate the dependencies for the whole system, once the polling engine is given the topology of the whole system.

The apparatus of FIG. 14 may perform, at least, the method of FIG. 13. Apparatus 10 can include a processor 22 for processing information and executing instructions or operations. Processor 22 can be any type of general or specific purpose processor. While a single processor 22 is shown in FIG. 14, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, preceding of antenna gain/phase parameters, encoding and decoding of individual bits forming a communication message, formatting of information, and overall control of the apparatus 10, including processes related to management of communication resources. Apparatus 10 may also operate as a transceiver in the form of a network card that plugs into a network.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 15:
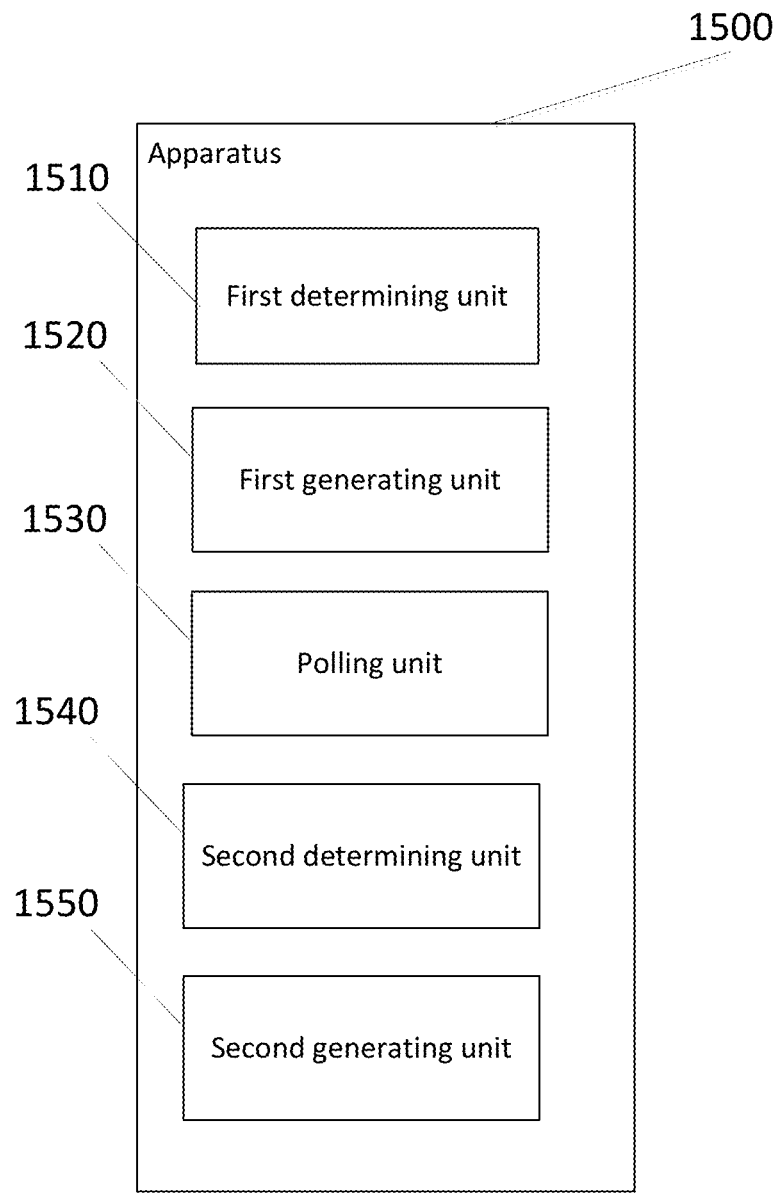
FIG. 15 illustrates an apparatus in accordance with certain embodiments of the invention.

FIG. 15 illustrates an apparatus in accordance with certain embodiments of the invention. Apparatus 1500 can be a network element/entity such as a network node that is configured to perform as a polling engine, for example. Apparatus 1500 can include a first determining unit 1510 that determines a root. The root includes a first node within a cluster of nodes of a network. Apparatus 1500 may also include a first generating unit 1520 that generates at least one network dependency between the root and a second node. The at least one generated network dependency corresponds to a connection between nodes of the network. The at least one generated network dependency corresponds to a directional path from the polling engine to the second node. Apparatus 1500 may also include a polling unit 1530 that polls the second node. The polling occurs via the at least one network dependency that has been generated between the polling engine and the second node. Apparatus 1500 may also include a second determining unit 1540 that determines that the second node is unreachable. Apparatus 1500 may also include a second generating unit 1550 that generates activated alerts relating to the unreachable second node, if any of the parent nodes of the second node are determined to be reachable by apparatus 1500.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining, by a polling engine, a root, wherein the root comprises a first node within a cluster of nodes of a network;
   generating at least one network dependency between the root and a second node, wherein the at least one generated network dependency corresponds to a connection between nodes of the network, and the at least one generated network dependency corresponds to a directional path from the polling engine to the second node;
   polling the second node, wherein the polling occurs via the at least one generated network dependency; and
   determining that the second node is unreachable, wherein
   at least one manually-added network dependency corresponds to a directional path connection between the polling engine and the second node, and
   the at least one generated network dependency is in a directional path unreversed of the directional path of the at least one manually-added network dependency and is generated to allow multiple dependencies with only non-manually-added network dependencies.

2. The method according to claim 1, wherein the determining the root comprises determining the root based on at least one of a user definition and a local information of the polling engine.

3. The method according to claim 1, wherein the at least one manually-added network dependency has precedence over the at least one generated network dependencies.

4. An apparatus, comprising:
   at least one processor; and
   at least one memory including computer program code,
   the at least one memory and the computer program code configured, with the at least one processor, to cause the apparatus at least to:
   determine a root, wherein the root comprises a first node within a cluster of nodes of a network;
   generate at least one network dependency between the root and a second node, wherein the at least one generated network dependency corresponds to a connection between nodes of the network, and the at least one generated network dependency corresponds to a directional path from the apparatus to the second node;
   poll the second node, wherein the polling occurs via the at least one generated network dependency; and determine that the second node is unreachable, wherein
at least one manually-added network dependency corresponds to a directional path connection between the polling engine and the second node, and
the at least one generated network dependency is in a directional path unreversed of the directional path of the at least one manually-added network dependency and is generated to allow multiple dependencies with only non-manually-added network dependencies.

5. The apparatus according to claim 4, wherein the determining the root comprises determining the root based on at least one of a user definition and a local information of the apparatus.

6. The apparatus according to claim 4, wherein the at least one manually-added network dependency has precedence over at least one of the at least one generated network dependencies.

7. A computer program product embodied on a non-transitory computer readable medium, the computer program product configured to control a processor to perform a method comprising:
   determining, by a polling engine, a root, wherein the root comprises a first node within a cluster of nodes of a network;
   generating at least one network dependency between the root and a second node, wherein the at least one generated network dependency corresponds to a connection between nodes of the network, and the at least one generated network dependency corresponds to a directional path from the polling engine to the second node;
   polling the second node, wherein the polling occurs via the at least one generated network dependency; and
   determining that the second node is unreachable, wherein
   at least one manually-added network dependency corresponds to a directional path connection between the polling engine and the second node, and
   the at least one generated network dependency is in a directional path unreversed of the directional path of the at least one manually-added network dependency and is generated to allow multiple dependencies with only non-manually-added network dependencies.

8. The computer program product according to claim 7, wherein the determining the root comprises determining the root based on at least one of a user definition and a local information of the polling engine.

9. The computer program product according to claim 7, wherein the at least one manually-added network dependency has precedence over at least one of the at least one generated network dependencies.

* * * * *